United States Patent [19]

Mayama et al.

[11] 4,118,231
[45] Oct. 3, 1978

[54] LIGHT-SENSITIVE SILVER HALIDE PHOTOGRAPHIC MATERIALS CONTAINING ANTISTATIC AGENTS

[75] Inventors: Masayoshi Mayama; Sadatugu Terada; Toshio Muramatsu, all of Hachioji; Masayuki Kimura, Hino; Masao Ishibara, Hino; Tohru Kobayashi, Hino, all of Japan

[73] Assignees: Konishiroku Photo Industry Co., Ltd.; Hokuetsu Paper Mills Ltd., both of Tokyo, Japan

[21] Appl. No.: 779,229

[22] Filed: Mar. 18, 1977

Related U.S. Application Data

[63] Continuation of Ser. No. 582,426, May 30, 1975, abandoned, which is a continuation-in-part of Ser. No. 339,004, Mar. 7, 1973, abandoned.

[30] Foreign Application Priority Data

Mar. 8, 1972 [JP] Japan .................................. 47-23141
Mar. 15, 1972 [JP] Japan .................................. 47-25755

[51] Int. Cl.$^2$ .......................... G03C 1/78; G03C 1/72; G03C 5/28
[52] U.S. Cl. .................................. 96/87 A; 96/61 R; 96/61 M; 96/62; 96/66.3; 96/87 R; 96/114.2; 96/114
[58] Field of Search ............... 264/DIG. 18; 252/382; 96/87 A, 87 R, 114, 114.2, 61 R, 61 M, 62, 66.3

[56] References Cited

U.S. PATENT DOCUMENTS

| | | | |
|---|---|---|---|
| 3,705,806 | 12/1972 | Sykes et al. | 96/61 R |
| 3,743,608 | 7/1973 | Habu et al. | 96/87 A |
| 3,811,887 | 5/1974 | Ishihara et al. | 96/50 R |
| 3,876,430 | 4/1975 | Tsuji et al. | 96/87 R |

*Primary Examiner*—Jack P. Brammer
*Attorney, Agent, or Firm*—Haseltine, Lake & Waters

[57] ABSTRACT

Static resistance of a light-sensitive silver halide photographic material is improved by treating said material with a solution or dispersion of a polymer containing quaternary ammonium groups, and which also acts as an antifoaming agent in processing solutions. The polymeric moiety of the polymer has the formula

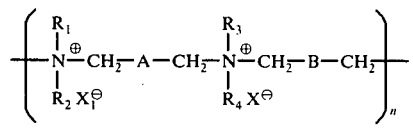

wherein $R_1$, $R_2$, $R_3$, and $R_4$ are individually a substituted or unsubstituted alkyl group having 1 to 4 carbon atoms; A and B are individually an alkylene group having 1 to 4 carbon atoms, a hydroxymethylene group, a phenylene group or a mere bond; $X_1^\ominus$ and $X_2^\ominus$ are individually an anion; and $n$ is an integer of 10 to 30.

3 Claims, No Drawings ial, static charges are prevented from occurring and, at the same time, foaming is prevented to eliminate the undesirable phenomena attributable to said foaming.

LIGHT-SENSITIVE SILVER HALIDE PHOTOGRAPHIC MATERIALS CONTAINING ANTISTATIC AGENTS

CROSS REFERENCE TO RELATED APPLICATION:

This is a continuation of application Ser. No. 582,426, now abandoned, filed May 30, 1975 which is a continuation-in-part of application Ser. No. 339,004, filed Mar. 7, 1973, now abandoned.

This invention relates to a novel process for the treatment of light-sensitive silver halide photographic materials. More particularly, the invention pertains to a novel process for the antistatic and developing treatments of light-sensitive silver halide photographic materials.

Ordinarily, light-sensitive silver halide photographic materials are subjected to antistatic treatment, matting treatment. Further such photographic material is usually subjected to such treatments as development, water-washing, fixing, etc. In these treatments, there have been used various compounds. However, light-sensitive silver halide photographic materials are quite susceptible to these compounds and tend to be easily denatured when brought into contact therewith. In the case of light-sensitive silver halide photographic materials, therefore, it has been necessary in the past to select compounds which have no detrimental effects not only on the photosensitive layers of said photographic materials but also on the images formed after development of the photographic materials.

Generally, a photographic film is liable to be statically charged due to abrasion or peeling to cause dust adhesion, electric shock, ignition and the like drawbacks. For example, at the time of preparing a light-sensitive photographic material, the photographic film is charged with static electricity due to abrasion with or pooling from other substances during various steps such as rolling-up, rolling-back, coating of various layer including photosensitive layers, and transportation at the time of drying, and when said electricity is discharged, the photographic material coated with the photosensitive layer will, after exposure and development, have unevenly sensitized portions called static marks due to irregular static electricity. Further, if the light-sensitive material thus prepared is statically charged when it is used or processed, static marks are formed as well, and many disadvantages derived from adhesion of dust or the like are brought about. The formation of static marks tends to become more marked because of the recent trends that not only have photographic materials been increased in sensitivity but also there are many such opportunities in which they are subjected to severe mechanical treatments due to the automatic rapid processing carried out at present.

In order to prevent photographic materials from acquiring a static charge, it has heretofore been the practice to coat various compounds on the surface layers thereof, so that the photographic materials are reduced in specific surface resistivity and thus are freed from or decreased in the property of being charged with static electricity. However, actually most of these compounds are degraded in antistatic effect with time, or even if the compounds are more or less satisfactory in antistatic effect, they have an undesirable influence on the photosensitive layers in deteriorating the photographic properties, and thus cannot sufficiently accomplish the purpose of application thereof.

Further, when light-sensitive photographic materials are subjected to development, various surface active agents flow out and accumulate in the processing solutions to form foams, with the result that various disadvantages are brought about. For example, in a laboratory, such treatments as development, stopping, film-hardening, bleaching and fixing, or a combination of said treatments, are carried out continuously in most cases over a long period of time while supplying replenish solutions, and if the processing solution is vigorously stirred, the solution forms a large amount of foam to bring about such great operational drawbacks a migration of the processing solution into the adjacent bath, incomplete removal of floating foreign matter by overflow, etc. Further, when the foams adhere to the surface of the photosensitive emulsion layer of the light-sensitive photographic material, uneven development, incomplete fixing and incomplete stopping take place to form unevenly processed portions. In order to overcome the above drawbacks defoaming agents are ordinarily added to the processing solutions.

Defoaming substances which have been known hitherto include many compounds of the silicone, polyglycol and polyether types. Generally, however, defoaming substances which are excellent in defoaming effects are insoluble or difficultly soluble in water in most cases, and hence cannot uniformly disperse when added to processing solutions using water as a solvent. Accordingly, the defoaming substances adhere to the surfaces of photosensitive emulsion layers, or agglomerate and precipitae in the processing solutions, with the result that they are degraded in defoaming effect to make it difficult to sufficiently prevent the formation of unevenly processed portions and stains or a change in photographic properties. Although there are some water-soluble defoaming agents, they should be incorporated in considerably large amounts into the processing solutions in order to attain sufficient defoaming effects, and hence are liable to deteriorate the photographic properties of light-sensitive photographic materials processed with such processing solutions and to have an undesirable influence on the photographic materials. On the other hand, if the defoaming substances are decreased in amount in order to avoid said drawbacks, no sufficient defoaming effects can be attained. Thus, actually the defoaming substances available at present cannot sufficiently give the desired effects.

An object of the present invention is to provide an antistatic treatment process which has no detrimental effects on the photographic properties of light-sensitive photographic materials.

Another object of the present invention is to provide a novel treatment process which gives defoaming effects in the steps for preparation and processing of light-sensitive photographic materials.

In view of the state of the art mentioned above, the present inventors made extensive studies on compounds which have no such drawbacks as mentioned above, are easily soluble in processing solutions, can display sufficient antistatic and defoaming effects, and are not deprived of said effects during processing. As the result, the inventors have found that polymers having the formula shown below are excellent antistatic and defoaming agents having the aforesaid characteristics, and that when the said polymers are incorporated into processing solutions and light-sensitive photographic materials are treated with said processing solutions, the photographic materials can successfully be made antistatic without suffering from drawbacks derived from foaming of the processing solutions.

The exact nature of the terminals of the polymers according to the invention is not known, nor whether they are cyclic or linear in structure. However, the gist of the invention does not depend upon the types of terminal groups. The essential features resides solely in the number of recurring units specified by n in the following formulas, all of which represent possible structures:

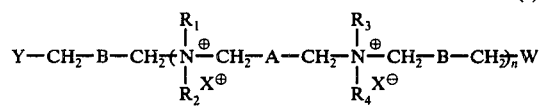
(a)

wherein Y and W are individually Cl, Br, I or

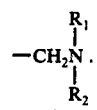
(b)

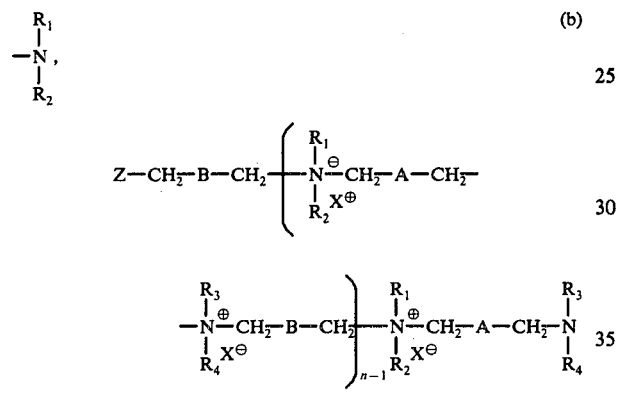

wherein Z is Cl, Br or I;

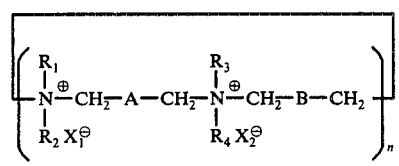
(c)

In all of the above formulas $R_1$, $R_2$, $R_3$ and $R_4$ are individually an alkyl group having 1 to 4 carbon atoms; A and B are individually an alkylene group having 1 to 6 carbon atoms, a hydroxymethylene group, a phenylene group or a mere bond; $X_1^{\ominus}$ and $X_2^{\ominus}$ are individually an anion; and $n$ is an integer of 10 to 30.

The above polymers may be obtained by polymerizing a dihalide of the formula Z—CH$_2$—B—CH$_2$—Z with a diamine of the formula

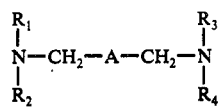

where A, B, R and Z have the same meaning as above. When an excess of the dihalide is used, it is estimated that the terminal groups are —CH$_2$Z. When an excess of the diamine is used, it is estimated that the terminal groups are

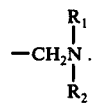

When stoichiometrically equal amounts of dihalide and diamine are used, it is estimated that the terminal groups are a mixture of —CH$_2$Z and

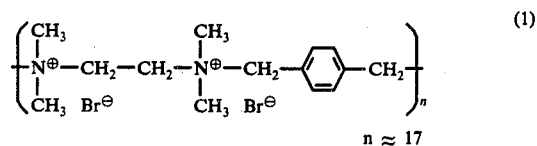

It is conceivable that some of the polymer chains may be cyclic as in formula (c).

Typical examples of polymeric structures having the above formula are as follows, the terminals being omitted for convenience:

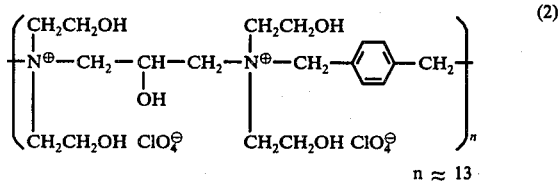
(1)
n ≈ 17

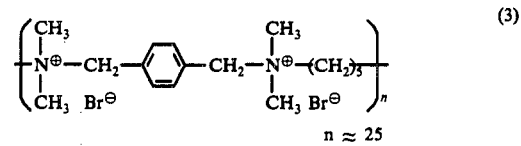
(2)
n ≈ 13

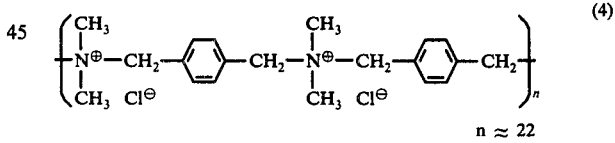
(3)
n ≈ 25

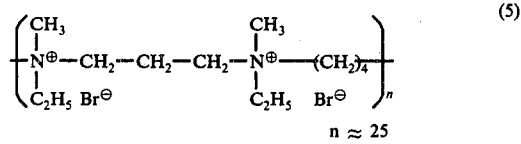
(4)
n ≈ 22

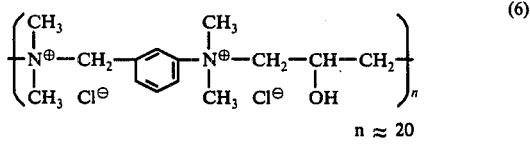
(5)
n ≈ 25

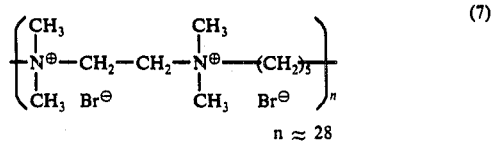
(6)
n ≈ 20

(7)
n ≈ 28

$$\left(\begin{array}{c}\underset{|}{C_4H_9}\\ -N^\oplus-CH_2-CH_2-CH_2-\underset{|}{\overset{|}{N^\oplus}}-CH_2-\underset{}{\underset{}{\bigcirc}}-CH_2-\\ \underset{|}{C_4H_9}\ CH_3COO^\ominus\quad\quad CH_3\ CH_3COO^\ominus\end{array}\right)_n \quad (8)$$

$$n \approx 16$$

$$\left(\begin{array}{c}\underset{|}{C_2H_5}\\ -N^\oplus-CH_2-CH_2-CH_2-\underset{|}{\overset{|}{N^\oplus}}-CH_2-CH_2-CH_2-\\ \underset{|}{C_2H_5}\ Br^\ominus\quad\quad C_2H_5\ Br^\ominus\end{array}\right)_n \quad (9)$$

$$n \approx 20$$

$$\left(\begin{array}{c}\underset{|}{CH_3}\\ -N^\oplus-CH_2-\underset{}{\bigcirc}-CH_2-\underset{|}{\overset{|}{N^\oplus}}-CH_2-\underset{}{\bigcirc}-CH_2-\\ \underset{|}{CH_3}\quad\quad CH_3\end{array}\right)_n \quad (10)$$

$$n \approx 20$$

$$H(CF_2)_8CH_2OCH_2\underset{\underset{OH}{|}}{CHCH_2}SO_3^\ominus \quad H(CF_2)_6CH_2OCH_2\underset{\underset{OH}{|}}{CHCH_2}SO_3^\ominus$$

Typical procedures for synthesizing the above-mentioned polymers are described below with reference to synthesis examples.

Synthesis Example 1 (Synthesis of a polymer having the exemplified polymeric structure (1):

A mixture comprising 11.6 g. of N,N,N',N'-tetramethyl-ethylenediamine and 26.4 g. of α,α-dibromo-p-xylene was dissolved in 140 ml. of dimethyl formamide. The resulting solution was allowed to react at room temperature for 1 week, and then treated with diethyl ether to deposit a white precipitate. After separation, the precipitate was washed with ether and then dried under reduced pressure to obtain 31.4 g. of the desired polymer having a molecular weight of about 6,500.

Elementary analysis (for $C_{14}H_{24}N_2Br_2$):

|  | C | H | N | Br |
|---|---|---|---|---|
| Calculated (%) | 44.23 | 6.37 | 7.37 | 42.02 |
| Found (%) | 43.38 | 6.94 | 7.21 | 41.45 |

The p-xylene derivative used as a starting material in this example is sometimes obtained in the form of a mixture with a m-xylene derivative, but such mixed xylene derivative may also be used to give a polymer effective for use in the present invention.

Synthesis Example 2 (Synthesis of a polymer having the exemplified polymeric structure (1)

A mixture comprising 19.2 g. of N,N,N',N'- tetramethyl-p-xylylenediamine and 17.5 g. of α,α'-dichloro-p-xylene was dissolved in 300 ml. of nitromethane. The resulting solution was allowed to react at room temperature for 1 week, and then treated with diethyl ether to deposit a precipitate. After separation, the precipitate was washed with acetone to form a powder and then dried under reduced pressure to obtain 29.5 g. of the desired polymer having a molecular weight of about 8,000.

Elementary analysis (for $C_{20}H_{28}N_2Cl_2$):

|  | C | H | N | Cl |
|---|---|---|---|---|
| Calculated (%) | 65.48 | 7.68 | 7.63 | 19.32 |
| Found (%) | 64.52 | 7.83 | 7.24 | 18.91 |

Synthesis Example 3 (Synthesis of a polymer having the exemplified polymeric structure (7)

A mixture comprising 11.6 g. of N,N,N',N'-tetramethyl-ethylenediamine and 23 g. of 1,5-dibromopentane was dissolved in 100 ml. of acetonitrile. The resulting solution was allowed to react at room temperature for 5 days, and then treated with acetone to deposit a precipitate. After separation, the precipitate was washed with acetone and then dried under reduced pressure to obtain 28.4 g. of the desired polymer having a molecular weight of about 7,500.

Elementary analysis (for $C_{11}H_{26}N_2Br_2$):

|  | C | H | N | Br |
|---|---|---|---|---|
| Calculated (%) | 58.16 | 7.57 | 8.09 | 46.15 |
| Found (%) | 57.69 | 7.93 | 7.91 | 46.45 |

In the present invention, the appication of polymers having the aforesaid general formula to light-sensitive photographic materials is most simply effected is such a manner that one or two or more of the polymers are dissolved in a proper solvent, e.g. water or an organic solvent or a mixture of these, to prepare a solution having a concentration of about 0.01 to 10%, and then the solution is applied to the surface of the film, which is intended to be treated, of a light-sensitive photographic material. For the application, there may be adopted any of such procedures as, for example, coating, spraying and dipping. The amount of the polymer applied varies depending on the kind and uses of the film to be treated. Generally, however, the polymer is applied in an amount of 3 to 300 mg. per $m^2$ of the film to be treated, whereby a sufficient antistatic effect can be attained.

Alternatively, the polymers may be applied in such a manner that one or two or more of the polymers are dissolved or dispersed in a suitable binder such as polyvinyl alcohol or gelatin, and the resulting solution or dispersion is applied as a separate layer onto the surface of the film to be treated.

Layers containing these polymers may be incorporated with other cationic polymers, plasticizers, antioxidents, stabilizers, cotorats, matting agents and the like additive which are required according to the intended function of the layers of photographic materials.

Ordinarily, a sub layer is formed on the support a light-sensitive photographic material in order to adhere a photosensitive layer onto the surface thereof. When the polymer according to the present invention is adhered onto the surface of the thus formed sub layer,, the support can sufficiently be prevented from charging of static electricity. Examples of such sub layers include layers of saponification products of plastic substrates and layers of maleic anhydride-vinyl acetate copolymers.

Generally, a light-sensitive photographic material has on the surface of the support thereof a photosensitive layer, a protective layer, a backing layer and the like, and it is also possible to apply the polymer according to the present invention onto the outermost layer of the light-sensitive photographic material having said layers.

Typical examples of the backing layer include layers of polyvinyl acetals, layers of copolymers containing vinylidene chloride, layers of cellulose esters, and layers composed of mixtures of said compounds. The polymer according to the present invention can, of course, be incorporated into any of the said layers.

As mentioned above, the polymer according to the present invention is applied either directly or indirectly through a proper layer to the support of a light-sensitive photographic material, whereby the photographic material can be made antistatic. If necessary, various layers may further be formed on the support or other layer of photographic material to which has been applied the polymer according to the present invention. Examples of such layers include protective layers, matting layers containing particles of silicon dioxide or the like, and layers containing anionic materials or fluorine-containing compounds.

Examples of the support of photographic material to which the present invention is applicable include cellulose triacetate films, polyethylene terephthalate and the like polyester films, polycarbonate films, polystyrene films, polyolefin films, and composite plastic films prepared by forming other layers on said films.

As the polymer used in the present invention, one having halogen ions as the anions is easily synthesizable. Further, the halogen ions may be easily substituted by other organic or inorganic anions, and a polymer having such anions can also impart excellent static resistance to a plastic film. Particularly, a polymer having as the anion carboxylic or sulfonic acid containing fluorine-substituted alkyl groups is effective. Alternatively, a polymer having the aforesaid anions in combination may also be used to attain the effect aimed at by the present invention.

The polymer according to the present invention can be used also as a defoaming agent to be added to a processing solution. Examples of the processing solution include pre-hardeners, washing baths, developers, stoppers, hardeners, bleachers, fixers and the like processing solutions for light-sensitive black-white and color photographic materials, and combined develop-fixers, bleach-fixers and the like composite solutions for said photographic materials. The polymer may be added directly to the processing solution or may be incorporated into a processing solution set.

The type of treatment to which the present process is applicable includes all types of development treatment such as long feet film development, usual reeled film development, spray type development, etc. Further, the procedure for agitating the processing solution includes all such ordinary procedures as stirring with machines, introduction of nitrogen or air bubbles, injection of liquids, and vibration and rotation of photographic materials.

In the present invention, the amount of the polymer to be added to the processing solution is not particularly limited, but the formation of such foams as to bring about substantial injury can sufficiently be prevented when the polymer is added in an amount of 0.005 to 0.5 g. per liter of the processing solution.

Light-sensitive photographic materials to which the present process is applicable include various photographic materials according to the diffusion transfer method, direct reversal method and silver dye bleaching method, in addition to black-white and color negative films and reversal positive films, printing papers and the like materials which are processed according to ordinary processing steps.

The defoaming ability of the polymer used in the present invention is explained below with reference to a test example.

Test Example

To each of a color negative film developer of the below-mentioned formulation (I) and a stop-fixer of the below-mentioned formulation (II) was added each of a surface active agent A (sodium dodecylbenzenesulfonate) and a surface active agent B (butylphenoxy polyethylene glycol sulfonic acid) which were used as compounds corresponding to surface active agents dissolving out of light-sensitive photographic materials.

| Formulation (I): | |
|---|---|
| Water | 800 ml. |
| Benzyl alcohol | 3.8 ml. |
| Sodium hexametaphosphate | 2.0 g. |
| Sodium sulfite (anhydrate) | 2.0 g. |
| Sodium carbonate (monohydrate) | 50.0 g. |
| Potassium bromide | 1.0 g. |
| Sodium hydroxide (10% aqueous solution) | 5.5 ml. |
| 4-Amino-3-methyl-N-ethyl-N-(methylsulfonamidoethyl) aniline 3/2 $H_2SO_4$ monohydrate | 5.0 g. |
| Water to make | 1 liter |
| Formulation (II): | |
| Water | 600 ml. |
| Sodium thiosulfate (pentahydrate) | 100 g. |
| Sodium sulfite (anhydrate) | 10 g. |
| Glacial acetic acid | 20 ml. |
| Potassium alum | 10 g. |
| Sodium hydroxide | 7.5 g. |
| Water to make | 1 liter |

The resulting mixtures were individually incorporated with each of such defoaming agents as the exemplified polymers (1), (4) and (7), a control polymer A [polytrimethyl(vinyloxymethyl)ammonium-p-toluenesulfonate; average molecular weight 50,000] and a control polymer B (poly-4-vinyl-N-acetonitrile pyridinium bromide; average molecular weight 30,000) to prepare 8 samples of the formulation shown in Table 1.

Table 1

| Sample No. Formulation | 1 | 2 | 3 | 4 | 5 | 6 | 7 | 8 |
|---|---|---|---|---|---|---|---|---|
| Formulation (I) | 1 liter | 1 liter | 1 liter | 1 liter | 1 liter | — | — | — |
| Formulation (II) | — | — | — | — | — | 1 liter | 1 liter | 1 liter |
| Surface active agent A (1% aqueous solution) | 0.5 ml. | 0.5 ml. | 0.5 ml. | 1.5 ml. | 1.5 ml. | — | — | — |
| Surface active agent B (1% aqueous solution) | — | — | — | — | — | 3 ml. | 3 ml. | 3 ml. |
| Defoaming agent (1% aqueous solution) | — | Exemplified polymer (1) | Control polymer A | — | Exemplified polymer (4) | — | Exemplified polymer (7) | Control polymer B |

Table 1-continued

| Sample No. | 1 | 2 | 3 | 4 | 5 | 6 | 7 | 8 |
|---|---|---|---|---|---|---|---|---|
| Formulation | | | 0.1 ml. | 0.5 ml. | | 0.5 ml. | 1 ml. | 1 ml. |

Each of the thus prepared samples were measured in foaming degree according to the shaking method carried out in such a manner that 20 ml. of the sample was tightly closed in a test tube having an inner diameter of 20 mm. whose inner surface had been cleaned, was subjected to 25 cm. vertical movements of 30 times per 10 seconds, and was measured as to average height of foams formed after 10, 30, 60 and 120 seconds. The results obtained were as shown in Table 2.

Table 2

| Sample No. | Time after foaming by shaking (sec.) | | | |
|---|---|---|---|---|
| | 10 | 30 | 60 | 120 |
| | Average height of foams | Average height of foams | Average height of foams | Average height of foams |
| 1 | 15 mm. | 13 mm. | 12 mm. | 12 mm. |
| 2 | 0 mm. | — | — | — |
| 3 | 9 mm. | 7 mm. | 6 mm. | 5 mm. |
| 4 | 35 mm. | 35 mm. | 32 mm. | 30 mm. |
| 5 | 0 mm. | — | — | — |
| 6 | 22 mm. | 18 mm. | 15 mm. | 14 mm. |
| 7 | 0 mm. | — | — | — |
| 8 | 8 mm. | 6 mm. | 5 mm. | 5 mm. |

As is clear from Table 2, the samples incorporated with the exemplified polymers (1), (4) and (7) are low in foaming degree, and the foams formed in said samples disappear quite rapidly. The samples incorporated with the control polymers A and B also show defoaming effects, but are lower in said effect than the samples incorporated with the exemplified polymers of the present invention.

The present invention is illustrated in further detail below with reference to examples, but the invention is not limited to these examples.

EXAMPLE 1

To a solution of 8 g. of the exemplified polymer (1) (the polymer produced in Synthesis Example 1) in 350 ml. of methanol was added 650 ml. of acetone to prepare a solution (A). This solution was coated on one side of a cellulose triacetate film (I) in a proportion of 25 ml/m$^2$ (200 mg/m$^2$) and then dried to obtain an antistatic cellulose triacetate film (II). The surface of each of the films (I) and (II) was subjected to subbing treatment, and a silver halide emulsion was coated on the resulting sub layer and then dried. Subsequently, the films were individually measured in specific surface resistivity under the conditions of 25° C. and 50% RH. As the result, the specific surface resistivity of the film (I) was more than $1 \times 10^{15}$ Ω, whereas that of the treated surface of the film (II) was $1 \times 10^9$ Ω.

EXAMPLE 2

To a solution of 2 g. of cellulose diacetate in 600 ml. of acetone was added 400 ml. of methanol. Into this solution, 1 g. of silicon dioxide particles of 0.1 to 1 μ in particle size were dispersed to form a dispersion (P). This dispersion was coated on one side of the cellulose triacetate film (I) in a proportion of 20 ml/m$^2$ and then dried to obtain a cellulose triacetate film (III) having an inter layer. Subsequently, 1 g. of the exemplified polymer (4) (the polymer produced in Synthesis Example 2) was dissolved in 700 ml. of methanol, and 300 ml. of acetone was added to the resulting solution to prepare a solution (C). This solution (C) was coated on the inter layer of the film (III) in a proportion of 20 ml/m$^2$ (20 mg/m$^2$) and then dried to obtain an antistatic cellulose triacetate film (IV). Subsequently, the films were individually measured in specific surface resistivity under the same conditions as in Example 1. As the result, the specific surface resistivity of the treated surface of the film (IV) was $1 \times 10^{11}$ Ω, whereas that of the film (III) was more than $1 \times 10^{15}$ Ω.

EXAMPLE 3

0.5 Gram of the exemplified polymer (7) (the polymer produced in Synthesis Example 3) and 50 g. of resorcinol were dissolved in 1,000 ml. of methanol to prepare a solution (D). This solution was coated on one side of a polyethylene terephthalate film (V) in a proportion of 15 ml/m$^2$ (8 mg/m$^2$) and then dried to obtain an antistatic polyethylene terephthalate film (VI). Subsequently, the films (V) and (VI) were individually measured in specific surface resistivity under the same conditions as in Example 1. As the result, the specific surface resistivity of the treated surface of the film (VI) was $3 \times 10^{11}$ Ω, whereas that of the film (V) was more than $1 \times 10^{13}$ Ω.

EXAMPLE 4

0.1 Gram of silicon dioxide particles of 0.1 to 1 μ in particle size were dispersed in a mixed solution comprising 400 ml. of acetone and 600 ml. of methanol to prepare a dispersion (E). This dispersion was coated on the treated surface of the antistatic cellulose triacetate film (II) prepared in Example 1 to obtain an antistatic cellulose triacetate film (VII) having a roughened and nonadherent surface. The antistatic property of thus obtained film was identical with that of the film (II).

EXAMPLE 5

The solution (C) in Example 2 was mixed with 0.1 g. of a triethylamine salt of stearyl phosphoric acid ester to prepare a solution (F). This solution was coated, in place of the solution (C) in Example 2, on the inter layer of the cellulose acetate film (III) having an inter layer and then dried to obtain an antitstatic cellulose triacetate film (VIII) having a proper lubricity. The antistatic property of the thus obtained film was identical with that of the film (IV) obtained in Example 2.

EXAMPLE 6

A mixture comprising 0.5 g. of the exemplified polymer (4) and 1 g. of poly-1-vinyl-3-methylimidazolium-p-toluenesulfonate was dissolved in 700 ml. of methanol. To the resulting solution was added 300 ml. of acetone to prepare a solution (G). In the same manner as in Example 2, the solution (G) was coated on the inter layer of the cellulose triacetate film (III) and then dried to obtain an antistatic cellulose triacetate film (IX).

On the other hand, 1 g. of poly-1-vinyl-3-methylimiazolium-p-toluenesulfonate was dissolved in 700 ml. of methanol. To the resulting solution was added 300 ml. of acetone to prepare a solution (H). In the same manner as in Example 2, the solution (H) was coated on the inter layer of the film (III) and then dried to obtain a film (X).

The thus obtained films (IX) and (X) were individually measured in specific surface resistivity under the same conditions as in Example 1. As the result, the specific surface resistivity of the film (IX) was $3 \times 10^9$ $\Omega$, and that of the film (X) was $1 \times 10^{14}$ $\Omega$.

EXAMPLE 7

The untreated surfaces of the antistatic films (II), (IV), (VI), (VII), (VIII) and (IX), one side of each of the films (I), (V) and (X), and the untreated surface of the film (III), which were obtained in Examples 1 to 6, were individually subjected to subbing treatment according to an ordinary procedure, coated with a high speed silver halide photographic emulsion, and then dried to prepare light-sensitive photographic materials.

These photographic materials were individually moistened for 24 hours under the conditions of 25° C. and 50% RH, rubbed with a vinyl chloride rod under the same conditions as above, and then subjected to ordinary development to observe the formation of static marks. As a result, quite a number of static marks were observed in the photographic materials having the films (I), (III), (V) and (X) as the supports, whereas no static marks were observed in the photographic materials having the antistatic films (II), (IV), (VI), (VII), (VIII) and (IX) as the supports.

In developing the individual photographic materials, there was used an automatic developing machine having a developer cell of the type wherein the developer is stirred by introduction of nitrogen gas. As a result, the developer in the cell foamed and flowed out of the cell when each of the photographic materials having the films (I), (III), (V) and (X) an the support was treated, whereas the developer scarecely foamed when each of the photographic materials having the films (II), (IV), (VI), (VII), (VIII) and (IX) as the supports was treated.

The photographic properties of these individual photographic materials were the same, and it was recognized that the polymers used in the antistatic treatments had no detrimental effects on the photographic properties of the photographic materials.

EXAMPLE 8

Both sides of the polyethylene terephthalate film (V) were subjected to rubbing treatment according to an ordinary procedure, and a silver halide emulsion and a protective layer-forming solution were coated on each side of the film and then dried to obtain a film (XI) having photosensitive layers on both sides. Subsequently, a solution (J), which had been prepared by dissolving 1 g. of the exemplified polymer (1) in 1,000 ml. of methanol, was coated on each side of the film (XI) in a proportion of 15 ml/m$^2$ (15 mg/m$^2$) and then dried to obtain an antistatic film (XII) having photosensitive layers on both sides. The films (XI) and (XII) were individually subjected to light exposure through an X-ray image and then developed to observe the formation of static marks. As the result, static marks were observed in the film (XI), whereas no static marks were observed in the film (XII). No difference in photographic properties were soon between the film (XI) and the film (XII).

EXAMPLE 9

In this example, there were used automatic developing machines having developer baths of the type wherein the developer is stirred by introduction of nitrogen gas. Into the developer bath of one developing machine was charged a color developer of the aforesaid formulation (I), while in the developer bath of the other developing machine was charged a color developer of the formulation (I) which had been mixed with a 1% aqueous solution of the exemplified polymer (4) in the proportion of 0.5 ml. per liter of said developer. Further, into each of the stopper, hardener, bleacher and fixer baths of the two developing machines was charged a processing solution of a definite formulation, and a color negative film was continuously processed by means of each developing machine. as the result, the developer of the prescription (I) gradually foamed, and the color negative film processed with said developer came to formm unevenly developed portions, whereas the developer incorporated with the exemplified polymer (4) scarcely foamed even when the development was continuously conducted over a long period of time, and excellent development could always be carried out by use of said developer. The concentration of each processing solution was always maintained constant by supplying a fresh solution.

EXAMPLE 10

In this example, there were used automatic developing machines for black-white printing papers. Into the developer bath of each developing machine was charged a black-white printing paper developer of the formulation (III) shown below which contained sodium carbonate as an alkali agent.

| Formulation (III): | |
|---|---|
| Water | 800 ml. |
| Sodium sulfite | 40 g. |
| 1-Phenyl-3-pyranolidone | 0.2 g. |
| Hydroquinone | 5 g. |
| Sodium carbonate (monohydrate) | 30 g. |
| Potassium bromide | 0.01 g. |
| Benzotriazole | 0.01 g. |
| Water to make | 1 liter |

Into the stop-fixer bath of the individual developing machines was charged each of a stop-fixer of the aforesaid formulation (II) and a stop-fixer of the formulation (II) which had been incorporated with a 0.5% aqueous solution of the exemplified polymer (7) in a proportion of 0.5 ml. per liter of said stop-fixer. Further, into the stabilizer bath of each developing machine was charged a processing solution of a definite formulation. Using these developing machines, a large number of black-white printing papers were processed. As the result, the stop-fixer of the formulation (II) formed many foams due to generation of carbon dioxide derived from decomposition of the sodium carbonate in the developer which had been brought into the developer together with the printing papers, and the thus formed foams migrated into the adjacent developer bath to deteriorate the development efficiency of the printing papers. In contrast to this, the stop-fixer incorporated with the exemplified polymer (7) scarcely foamed and caused no injury in carrying out the development.

At this stage, a part of the stop-fixer was recovered from each developing machine and was measured in foaming degree according to the same procedure as in Text Example to obtain the results set forth in Table 3.

Table 3

| Stop-fixer | Time after foaming by shaking (sec.) | | |
| --- | --- | --- | --- |
| | 10 Average height of foams | 30 Average height of foams | 60 Average height of foams |
| Formulation (II) | 15 mm. | 11 mm. | 9 mm. |
| porate: with The exemplified polymer (V) | 1 mm. | 0 mm. | — |

As is clear from Table 3, the foaming degree of the stop-fixer incorporated with the exemplified polymer (7) according to the present invention is far lower than that of the fixer of the formulation (II).

The molecular weight of the polymers of the invention was determined in the following manner. A sample was dissolved in a 0.2N aqueous KCl solution, and the solution was measured for viscosity [$\eta$] at 30° C. with an Ostwald's viscometer.

$$[\eta] = \lim_{C \to O} (\frac{\eta - \eta_o}{\eta o}) / C \; 1 \times 10^{-4} M^{0.9}$$

wherein $\eta$ : Viscosity of the test solution $\eta o$: Viscosity of the 0.2N aqueous KCl solution $C$: Concentration of the sample in the solution $M$: Molecular weight

We claim:

1. A light-sensitive silver halide photographic material comprising a support, a silver halide emulsion layer and a layer consisting essentially of a polymer of the formula

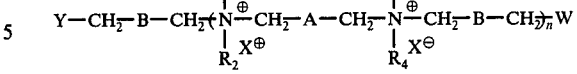

wherein Y and W are individually Cl, Br, I or

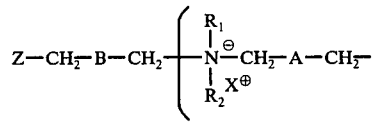

wherein Z is Cl, Br or I, or

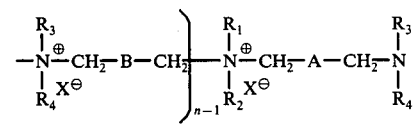

and wherein $R_1$, $R_2$, $R_3$, and $R_4$ are individually an alkyl or hydroxyalkyl group having 1 to 4 carbon atoms, a hydroxymethylene group, a phenylene group or a mere bond; $X_1^\ominus$ and $X_1^\ominus$ are individually an anion; and $n$ is an integer of 10 to 30.

2. The light-sensitive silver halide photographic material of claim 1, wherein the polymer is present in an amount of from 3 to 30 mg/m².

3. The light-sensitive silver halide photographic material of claim 1, wherein the anion is selected from the group consisting of halogen ions, ClO$_4$-ions, carboxylic ions and sulfonic acid ions containing fluorine-substituted alkyl groups.

* * * * *